United States Patent

[11] 3,597,576

[72] Inventors Arthur A. Bernard
Beecher;
Richard A. Bernard, Flossmoor, both of, Ill.
[21] Appl. No. 841,848
[22] Filed July 15, 1969
[45] Patented Aug. 3, 1971
[73] Assignee Dover Corporation
New York, N.Y.

[54] SPATTER AND HEAT SHIELD FOR WELDING GUN
13 Claims, 9 Drawing Figs.
[52] U.S. Cl. .................................................. 219/130,
219/74, 219/136
[51] Int. Cl. .................................................. B23k 9/06
[50] Field of Search .................................... 219/130,
136, 75, 74

[56] References Cited
UNITED STATES PATENTS

| | | | |
|---|---|---|---|
| 2,612,584 | 9/1952 | Morrissey | 219/75 |
| 2,881,305 | 4/1959 | Wojciak et al. | 219/130 |
| 2,929,911 | 3/1960 | Bowers | 219/74 |
| 3,007,032 | 10/1961 | Whiteman | 219/130 |
| 3,025,387 | 3/1962 | Kinney | 219/130 |
| 3,123,702 | 3/1964 | Keidel et al. | 219/130 X |
| 3,270,179 | 8/1966 | Russell | 219/74 |

FOREIGN PATENTS 35,956  1/1965  Germany.

Primary Examiner—J. V. Truhe
Assistant Examiner—George A. Montanye
Attorney—Hume, Clement, Hume and Lee ABSTRACT: A heat and spatter shield for an arc-welding gun of the type used for applying gas-shielded consumable-electrode arc-welding processes. A shield element insulated from the welding current circuit is attachable to the arc-welding gun so as to be disposed at the downstream end of the current contact tip and extend beyond the downstream opening of the gas nozzle so as to shield the downstream opening of the gas nozzle from metal spatter ejected from the welding operation and from direct heat radiation from the welding arc. At least the core of the shield element is composed of a heat-resistant nonelectrically conductive material. The shield element is disposed in the gas stream and arranged to provide an airfoil effect contributing to formation of the proper flow configuration of the shielding gas. Cylindrical and spherical-type shield elements are disclosed. Various means are disclosed for attaching the shield element to the arc-welding gun.

PATENTED AUG 3 1971

INVENTORS
ARTHUR A. BERNARD
RICHARD A. BERNARD

INVENTORS
ARTHUR A. BERNARD
RICHARD A. BERNARD

SPATTER AND HEAT SHIELD FOR WELDING GUN

BACKGROUND - SUMMARY - DRAWINGS

This invention relates to arc-welding guns used for applying gas-shielded consumable-electrode arc-welding processes of the type in which continuous lengths of solid, tubular, and composite types of electrode are mechanically fed through the guns to the welding arc and in which a shielding gas from a source distinct from the electrode is also fed through the guns and through a gas nozzle to form a protective stream of shielding gas around the tip of the electrode is also fed through the guns and through a gas nozzle to form a protect stream of shielding gas around the tip of the electrode, around the arc itself, and over the surface of the molten weld metal. More particularly, this invention provides a means which prevents metal spatter and metal vapor ejected out of the weld bead crater from entering and plugging the gas nozzle. This invention also protects the gas nozzle and welding current contact tips of arc-welding guns from the direct radiant heat of the welding arc without interfering with the efficient flow of the shielding gas.

Gas-shielded consumable-electrode arc welding applied at an efficient rate of welding speed converts a large amount of electrode metal and base metal into weld metal in an hour. For example, when a 3/32-inch-size tubular-type electrode is deposited with a 550 ampere arc, the electrode is melted at a rate of about 175 inches per minute which amounts to about 22 pounds of electrode per hour, and simultaneously an equal amount of base metal is melted and converted into weld metal, bringing the total to about 44 pounds of weld metal per hour.

When an arc of such high amperage (550 amperes) is operating at the tip of a 3/32-inch-diameter electrode, the current density amounts to about 80,000 amperes per square inch area of the electrode. At this high density, the solid electrode metal is converted into metal vapor which leaves the tip of the electrode at a very high velocity, so high a velocity that the force of the jet action penetrates below the surface of the base metal to form a parabolic-shaped crater about five-sixteenths inch deep at the leading end of the weld.

As the vaporized metal is jetted into the crater, a small portion is deflected back out of the crater toward the shielding gas nozzle and condenses on the rim and on the inner wall of the gas nozzle. Moreover, the base metal to be fused contains nonmetallic inclusions and laminations containing oxides which, when exposed as the crater is formed and subjected to the intense heat of the arc, literally explode; and these eruptions blow back what is commonly called metal spatter into the gas nozzle where it combines with the condensing metal vapor around the inner wall of the gas nozzle, gradually reducing the inside diameter of the nozzle and harmfully restricting the flow of shielding gas therefrom.

The amount of expelled metal vapor and metal spatter produced by a 550 ampere arc operating at the tip of a 3/32-inch-diameter electrode can plug a gas nozzle so completely within 15 or 20 minutes that the efficiency of the gas-shielding operation is completely lost. It is therefore necessary for welding operators to stop welding about three times per hour to remove the plugging material from within the nozzles. Generally, the accumulation is dislodged by hammering the nozzle of the gun against the weldment to crack the ring of material on the inner wall of the nozzle into several pieces which are then loosened and picked out of the nozzle with needle nose pliers.

About one-fourth of every productive hour is lost cleaning the gas nozzles, and there are tens of thousands of arc-welding operators operating guns in U.S. industry. However, as costly as this lost time is, it is not as important as the nonuniformity of weld quality caused by the gas nozzles becoming plugged.

Heretofore, control of weld quality has been attempted by using gas nozzles with openings about twice the diameter required for an efficient stream of gas and by stopping welding and removing the accumulation before the opening is reduced to an inefficient size. For example, the openings of gas nozzles used for depositing 3/32-inch-size electrodes are generally about three-fourths inch in diameter, and when the accumulation reduces the size of the opening to about seven-sixteenths inch, the flow of gas starts to become inefficient and the quality of the weld starts to drop off.

The accumulation of metal spatter and condensed metal vapor within the opening of the shielding gas nozzle also limits the efficiency of gun-type arc welding. For example, the rate at which the plugging material accumulates within the nozzle is quite proportional to the volume of welding current used. Therefore, if the welding amperage used to convert 3/32-inch-size electrode into weld metal is increased from the above-mentioned 550 amperes to 600 amperes, the gain in the increase of deposition could be quite totally offset by the additional timeout for removing the increase in spatter. Consequently, of all the different problems which had to be solved in the design of arc welding guns to move the efficiency of gun-type arc welding up little-by-little by making it possible to use higher and higher welding currents to increase the rate of producing weld metal, the most difficult problem to solve has been to develop a means, which this present invention provides, to ensure that an efficient volume and proper pattern of shielding gas flows out of the gas nozzle all the time, yet does not permit weld metal spatter and metal vapor to enter the opening of the nozzle out of which the gas flows.

An equally important object of this invention is to provide a means which shields the gas nozzle and the welding current contact tip from the direct heat of the welding arc, yet, as mentioned above, does not interfere with the efficient flow of gas out of the gas nozzle needed to feed gas into the arc at the tip of the electrode, to shield the arc, and to blanket the molten weld metal at the base metal terminal. Such heat shielding is an absolute necessity if the efficiency of gun-type arc welding is to be improved. For example, the 80,000-ampere welding current density mentioned above which melts combined electrode metal and base metal to produce about 44 pounds of weld metal per hour is located within a fraction of an inch from the gas nozzle and the welding current contact tip, yet these parts of the gun must not be melted. Therefore, the only practical way that an increase in welding current density beyond 80,000 amperes can be achieved is to provide a shield which protects these portions of welding guns from the direct heat of the arc. The present invention provides such a shield.

To thoroughly understand how this invention performs, it must first be understood that the stream of gas which flows out of the gas nozzle of an arc-welding gun is used not only to shield the welding operation from harmful surrounding air but also to alter the characteristics and the analysis of the arc stream. For example, inert shielding gases are generally mixed with 5 percent to 25 percent oxygen or $CO_2$ gas to feed oxygen into the arc stream, and when the shielding gas is totally $CO_2$ gas, a percentage of the total volume fed out of the gas nozzle must enter into the arc stream. A thorough and complete description for the necessity of this phenomenon can be found in Bernard et al. U.S. Pat. No. 3,051,822, issued Aug. 28, 1962. In other words, by vacuum created by the jet force of the arc during welding, a certain portion of the gas distinct from the consumable electrode is drawn into and combined with the stream of metal vapor jetted from the tip of the electrode. Therefore, basic to the operation of the shield element of this invention in preventing metal spatter and metal vapor from entering the gas nozzle and in shielding the gas nozzle and the welding current contact tip from direct rays of arc heat is the ability of the shield element to cause the shielding gas to flow as a circular curtain around the shield and then reform into a shape substantially of uniform density throughout its cross section at the downstream end of the shield so that the gas is in direct contact with the electrode between the shield and the tip of the electrode as required if the shielding gas is to perform the several functions which it is intended to perform.

It should be understood that this invention is equally valuable for depositing the full range of electrode sizes. References are made herein to particular dimensions preferred for depositing 3/32-inch-size electrode and are for example only.

Other objects and advantages of this invention will be apparent in the following description of this invention and in the accompanying drawings in which.

DETAILED DESCRIPTION OF EXEMPLARY EMBODIMENTS

Figure 1:
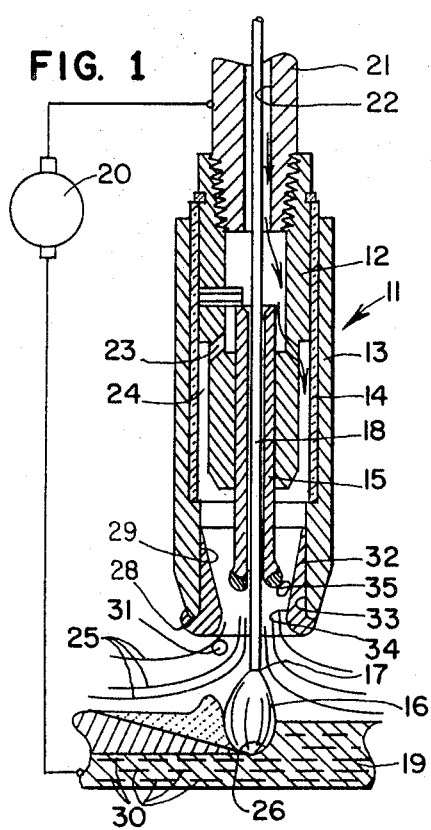
FIG. 1 is a diagrammatic cross-sectional view of the gas-shielded consumable-electrode arc-welding process applied with a conventional arc-welding gun and is included herein to illustrate the problems which the present invention solves.

Referring now to the drawings and particularly to FIG. 1 thereof, to conserve space only that portion of the arc-welding gun commonly called the head portion 11 is shown and consists of a head member 12, a gas nozzle 13, a gas-nozzle-insulating tube 14, and a welding current contact tip 15. To thoroughly and completely describe this invention, a welding arc 16 is shown between the tip 17 of the electrode 18 and a piece of base metal 19. Welding current from a power source 20 is conducted through a welding-current-conducting cable to the main trunk member 21 of the gun, through the main trunk member 21 into the head member 12, from the head member 12 into the welding current contact tip 15, into the electrode 18, and from the tip 17 of the electrode through the arc 16 to the base metal 19, and from the base metal back through a welding current cable to the power source 20. Or depending on the polarity of current used, the flow of current may be the reverse to that outlined above. Shielding gas from a separate source (not shown) is also fed into the bore 22 of the main trunk member 21, into the head member 12 where through suitable ports 23 the gas flows into a chamber 24 within the gas nozzle and out of the gas nozzle 13 in a continuous stream 25 to shield the welding operation.

During the welding operation when the welding current density exceeds about 50,000 amperes per square inch area of the electrode, the electrode metal at the tip 17 of the electrode, as previously mentioned, is converted into metal vapor which is jetted from the tip 17 of the electrode 18 at such velocity that the heat of the arc plus the velocity of the jet force forms a parabolic-shaped crater 26 below the surface of the base metal 19. It should be noted that as the vapor form of transferred metal is jetted into the parabolic-shaped crater 26, not all of the vaporized metal cools sufficiently within the crater to become liquid, with the result that at least a small portion of the jetted metal vapor is deflected back out of the parabolic-shaped crater 26 and condenses on the end 28 of the gas nozzle 13 and around the inside surface 29 of the gas nozzle 13.

As is well known in the art, all common types of steel contain impurities and oxides, and in FIG. 1 the short lines indicated by the reference numeral 30 are intended to represent minute-size laminations containing such impurities. As the formation of the crater advances along the course of welding and these entrapped impurities are exposed to the intense heat of the arc, a rather large volume of gas is generated which splashes globules 31 of liquid metal out of the crater 26 toward the gas nozzle where the splashed metal, commonly called metal spatter, combines with the metal vapor to produce the ring of nozzle-plugging material 32. It is important to note in FIG. 1 that the inside diameter of the gas nozzle 13 has been reduced from about ¾-inch diameter (indicated by reference numeral 33) to about 7/16-inch diameter (indicated by reference numeral 34), and it is beyond this point that the quality of the weld will be affected if the accumulation 32 is not removed. The purpose of the insulating tube 14 is to electrically insulate the gas nozzle from the electrically alive head member 12 of the gun so that a short circuit will not be produced should the nozzle 13 come into contact with the base metal 19. It is quite common, however, that one or more large globules of molten metal 35 ejected into the nozzle will bridge the space between an accumulated ring of solidified metal on the inner wall 33 of the gas nozzle 13 and the welding current contact tip 15 as shown in FIG. 1, in which case the gas nozzle becomes electrically alive. As noted further on, the present invention prevents this form of short circuiting from taking place.

Still referring to FIG. 1, due to the parabolic shape of the crater 26 a very high volume of heat is reflected from the crater 26 directly at the gas nozzle 13 and the welding current contact tip 15 within the nozzle. Obviously, the useful life of these components is affected by the temperature to which they are heated. Moreover, if the surfaces of these components are heated to become slightly liquid, the metal vapor and metal spatter ejected out of the weld bead crater becomes solidly fused to these components, in which case these parts must be scrapped.

Figure 2:
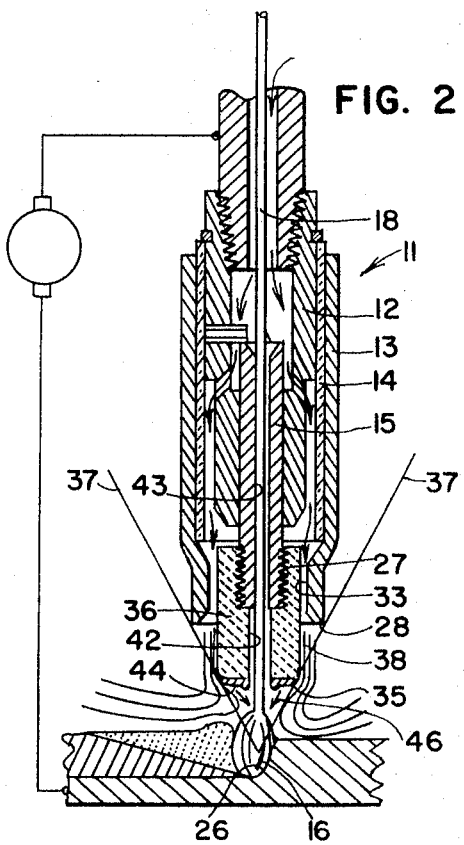
FIG. 2 is a diagrammatic cross-sectional view of the gas-shielded consumable-electrode arc-welding process applied with a conventional arc-welding gun which contains the means which this invention provides for shielding the opening of the gas nozzle from the heat of the arc and from metal spatter and metal vapor ejected out of the weld bead crater.

Referring now to FIG. 2, it should be noted that the shape and the dimensions of all parts of the head portion 11, namely, the head member 12, the gas nozzle 13, the insulating tube 14, and the welding current contact tip 15, are identical to that shown in FIG. 1 with the exception that the inside diameter 33 of the gas nozzle 13 from which the shielding gas 25 flows is smaller than that shown in FIG. 1, and the welding current contact tip 15 is provided at its downstream end with a cylindrical shield 36 in accordance with the present invention. With this invention, since the nozzle 13 cannot become plugged with metal spatter or condensed metal vapor, the inside diameter of the nozzle 13 need be no larger than that required to provide the proper volume and the required shape of gas stream 25. In this particular arrangement, the bore 33 of the nozzle 13 is about five-eighths inch. Within the bore 33 and protruding therefrom is the shield 36 of the invention which has a round cross-sectional shape about one-half inch in diameter. The upstream portion of the shield element spaced within the gas nozzle bore 33 cooperates with the gas nozzle bore 33 to define an annular port for the flow of shielding gas out of the gas nozzle. The thickness of the circular ring of gas 38 which flows out of the nozzle 13 around the shield 36 is therefore about one-sixteenth inch. It is important to note that the end 35 of the shield 36 protrudes beyond the end 28 of the nozzle 13 for a distance which casts a cone-shaped sheltered area shadow (indicated by lines 37-37) large enough to shield the current contact tip 15 and entire gas nozzle 13 from heat which radiates outwardly from the arc 16 and from metal spatter and metal vapor ejected out of the weld bead crater 26. The size of the cone-shaped sheltered area can be reduced or increased in size by two different methods or by a combination of these two different methods, namely: (1) by increasing or decreasing the distance which the shield 36 protrudes beyond the end 28 of the gas nozzle 13; or (2) by increasing or decreasing the outside diameter of the cylindrical shield 36 in relation to the diameter of the gas nozzle. The shield element preferably extends beyond the downstream opening of the gas nozzle a distance sufficient to intercept any straight line drawn between the normal position of the core of the welding bead crater and the downstream opening of the gas nozzle. For guns used for handling the smaller sizes of electrode, all parts which make up the head portion 11 are generally proportionately smaller than that shown in FIG. 2, and for handling the larger range of electrode sizes all parts can be generally proportionately larger.

The bore 42 of the shield through which the electrode 18 is fed to the arc 16 should be slightly larger than the bore 43 through the welding current contact tip 15. Although the shield can be made of metal or have a metal shell as will be described further on, it is preferable that it be made of a ceramic-type material so that: (1) it is a nonconductor of welding current preventing metal spatter short circuits between the gas nozzle and the current contact tip; (2) metal spatter does not fuse to it when it is bombarded by liquid metal globules; and (3) it will better withstand the very high temperature of heat radiated from the arc. For example, for medium current density arcs, the shield may be composed basically of alumina which will withstand a temperature of about 3,700° F., or zirconia which will withstand 4,900° F., or other even higher-temperature-withstanding materials may be used. It should be noted, however, that during the welding operation, the shield itself becomes partly shielded from direct heat radiation from the arc due to the fact that the end of the shield 36 becomes coated with a thin layer of ejected metal. Such a thin layer of ejected metal which has accumulated on the arc-exposed end of the shield is indicated by reference numeral 44. During welding the accumulation 44 will continue to increase and may from time-to-time be wiped off the end of the shield by the gloved hand of the welding operator. However, it is seldom that the accumulation reaches a large size since it does not fuse to or become tightly adhered to the shield and will fall off when it becomes about one-eighth inch thick.

As mentioned above, the internal diameter of the nozzle is about five-eigths inch and the outside diameter of the shield is about one-half inch. It is important to understand how the circular stream of gas about one-sixteenth inch thick which flows out of the nozzle and down in tubular formation over the periphery of the shield 36 reforms into a stream directly under the arc stream at the tip 17 of the electrode 18. This condition is produced by: (1) an airfoil effect created at the arc end of the shield which directs the circular-shaped stream of gas around and under the arc end of the shield, plus (2) an evacuated zone indicated by reference numeral 46 created around and slightly above the tip of the electrode by the jet force of the arc. The circular curtain of gas 38 is curved around the downstream end of the shield 36 by the airfoil effect and attracted into the evacuated zone 46 and thus comes into contact with the surface of the electrode. The arc end of the cylindrical shield 36 need not be rounded as shown in FIG. 2. However, for positive assurance it is preferred that the arc end of the shield 36 be rounded to increase the airfoil effect.

The existence and the phenomenon of the evacuated area around the tip of an electrode produced by the jet force of high current density arc are thoroughly described in Bernard et al. U.S. Pat. No. 2,864,934, issued Dec. 16, 1958.

Figure 3:
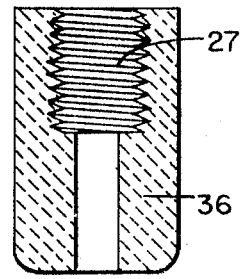
FIG. 3 illustrates the shield shown in FIG. 2 removed from the gun.

Referring now to FIG. 3, this drawing provides an enlarged view of the shield element 36 of this invention. As previously noted, the shield 36 is removably attached to the current contact tip 15 of FIG. 2 by threads 27. In other words, in the form shown in FIGS. 2 and 3, the spatter and heat shield of this invention is an entirely separate part of the gun and is available as a product attachable to conventional arc-welding guns. The welding current contact tip is simply threaded or is equipped with some other means to attach the shield thereto.

Figure 4:
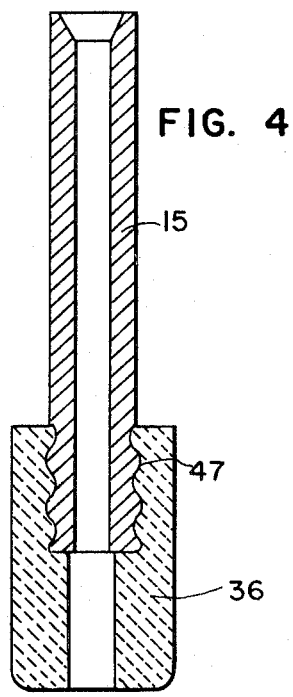
FIG. 4 illustrates the shield of this invention secured to the welding current contact tip of a welding gun.

Referring now to FIG. 4, this drawing provides an enlarged view of a modification of the spatter and heat shield of this invention in which the shield 36 is made integral with the welding current contact tip 15 since the life of the shield 36 is approximately the same as the life of the welding current contact tip. The welding current contact tip 15 is conventional in its general arrangement being an elongate member of electrically conductive material having a bore for passage of the electrode therethrough for establishing electrical contact with the electrode. However, in this instance the end portion of the contact tip 15 has a series of circular knurls 47, and the shield 36 is permanently affixed to the welding current contact tip by being molded thereon or cemented thereto. In this form, the spatter and heat shield and the current contact tip assembly are available as an integral product for attachment to conventional arc-welding guns, the welding current contact tip being attachable to the gun by any one of several types of conventional connecting methods in common use.

Figure 5:
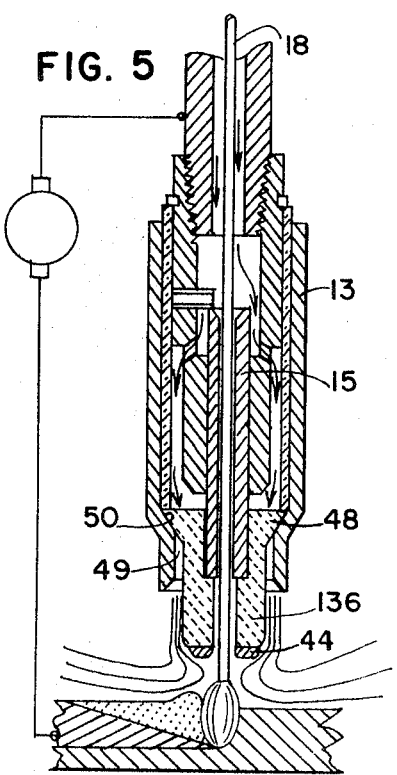
FIG. 5 illustrates another form of shield of this invention connected to the gun by a different method as compared with the method shown in FIG. 2.
Figure 6A:
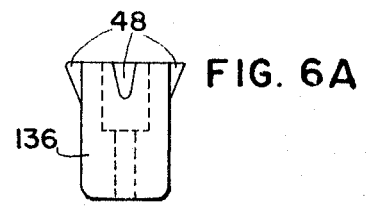
FIG. 6A illustrates in elevation the shield shown in FIG. 5 removed from the gun.
Figure 6B:
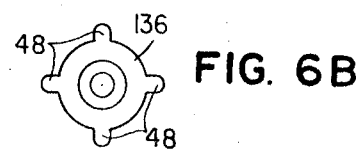
FIG. 6B is a top plan view of the shield shown in FIG. 6A.

Referring now to FIGS. 5, 6A, and 6B, there is illustrated a form of the spatter and heat shield element 136 of this invention which is attachable to conventional arc-welding guns by a method which is different as compared with that shown in FIG. 2. In this form of the invention, the cylindrical spatter and heat shield element 136 contains three or more projections 48 integral with the main body of the shield element 136 which span the annular gas channelway 49 to accurately locate the shield element within the bore of the gas nozzle and therefore within the stream of shielding gas. The shield element is held within the nozzle by engagement of the projections 48 with the nozzle where the bore of the nozzle tapers from a large diameter to a smaller diameter forming an interior circular ridge. As in the other embodiments, the central bore of the shield element is aligned with the bore of the current contact tip sufficiently to permit unimpaired passage of the electrode. Alternatively, the shield element 136 may be spaced from and held within the bore of the nozzle by other means such as integral projections extending into a circular step formed on the inner wall of the nozzle. It is important that the projections 48 be located on the shield element at its upstream end and not extend the total length of the shield element so that the stream of gas split into three or more separate streams by the projections 48 will reunite into a single tubular stream before leaving the end of the nozzle to flow over the periphery of the shield element as a continuous circular curtain of gas. Otherwise, if the projections are in the form of ribs or fins extending the full length of the shield element or if the projections are located to engage the gas nozzle at its lower opening, the curtain of gas will not be continuous, permitting surrounding air to penetrate the gas-shielding medium.

Figure 7:
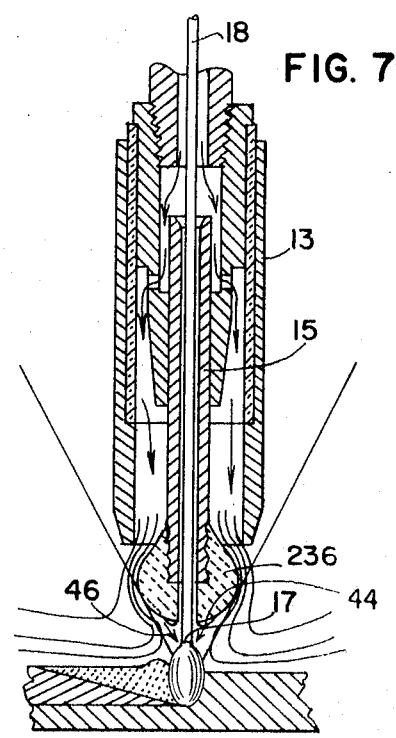
FIG. 7 is another modification of the metal spatter and heat shield of this invention.

In FIG. 7 the shield element 236 has a spherical configuration. It should be noted that the two phenomena used by this invention to transform the circular stream of gas which flows out of the gas nozzle around the shield element into a conventional-shaped stream at the downstream end of the shield element are more clearly illustrated in FIG. 7. As is generally known, when a sphere is placed within a stream of gas, the stream flows around the sphere and unites at the opposite end of the sphere due to the airfoil effect. For example, when the flame of a match is held under a sphere such as a ¼-inch-diameter ball, the flame (or its combusted gases) reunites at the top side of the ball to form a stream which has a rather uniform cross section. The operation of this phenomenon in the present invention is clearly shown in FIG. 7. It is also generally known that when a gas is jetted out of the opening at the end of a small-diameter tube, a vacuum is produced around the end of the tube which, in turn, draws surrounding air into the jetted gas stream. As previously noted, this jet force vacuum is the second phenomenon employed in the present invention to draw the gas stream inwardly. In a high current density arc, as previously mentioned, solid electrode metal is expanded several hundred times into a metal vapor to produce a jet force. The resultant evacuated area is indicated by arrows 46 at the tip 17 of the electrode 18. The spherical-shaped shield element 236 shown in FIG. 7 is provided for attachment to a conventional welding current contact tip 15 or permanently connected to a welding current contact tip for attachment to conventional arc-welding guns.

Figure 8:
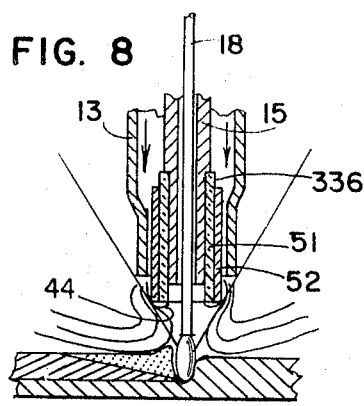
FIG. 8 is still another modification of this invention.

Referring to FIG. 8, the shield element 336 of this invention is of a composite design. It consists of a first tube 51 composed of nonelectrically conductive material telescoped over and affixed to the downstream end of the welding current contact tip 15 and a second tube 52 composed of unusually high-heat-resisting metal telescoped over and affixed to the first tube 51. The first tube 51 may be composed basically of aluminum oxide or zirconium oxide or other such high-heat-resisting nonelectrically conductive material and forms the core of the shield element 336. The second tube 52 may be composed of tungsten, tungsten carbide, or some other high-temperature-resisting metal or carbide and forms an outer tubular shell of the shield element 336. This composite design is provided for those welding operations in which the guns are subjected to very rough usage. Although the shield elements of this invention as shown in FIGS. 1 through 7 are composed of ceramic-type materials which will withstand considerable banging and scraping against the weldment, they do not have the endurance of metal under such conditions. The second tube shown in FIG. 8 is made of metal or a metal carbide to better withstand such hard usage.

From the foregoing description, it is seen that the present invention provides the markedly advantageous result of providing a heat and spatter shield for an arc-welding gun of the type used for applying gas-shielded consumable-electrode arc-welding processes. In summary, a shield element electrically insulated from the welding current circuit is attachable to the arc-welding gun so as to be disposed at the downstream end of the current contact tip and extend beyond the downstream opening of the gas nozzle so as to shield the downstream opening of the gas nozzle from metal spatter ejected from the welding operation and from direct heat radiation from the welding arc. The shield element preferably extends beyond the downstream opening of the gas nozzle a distance sufficient to intercept any straight line drawn between the normal position of the core of the weld bead crater and the downstream opening of the gas nozzle. The shield element has a central bore aligned with the bore of the current contact tip for passage of the electrode through the shield element but does not form part of the welding current circuit. At least a core of the shield element is composed of heat-resistant nonelectrically conductive material for electrically insulating said shield element from the welding current circuit. The shield element is disposed in the gas stream and is arranged to provide an airfoil effect contributing to formation of the proper flow configuration of the shielding gas.

Although arc welding guns are generally hand operated in semiautomatic arc welding, it should be understood that this invention is equally valuable for use with fully automatic apparatus.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

It should be noted that the term "metal spatter" when used herein in a general sense and as used in the claims refers to any metal ejected from the welding operation onto the welding gun including vaporized electrode metal deflected back toward the gun and metal projected toward the gun by eruptions in the weld bead crater.

What we claim is:

1. In an arc-welding gun for applying gas-shielded consumable-electrode arc-welding processes, the combination comprising: a nozzle having an opening at one end; and a current contact tube extending through said nozzle opening and having a downstream shield portion, said shield portion not forming part of a welding current circuit, said shield portion extending beyond said nozzle opening for such a distance that said nozzle is shielded from metal spatter and from arc heat radiating toward said nozzle.

2. In an arc-welding gun for applying gas-shielded consumable-electrode arc-welding processes, the combination comprising: a gas nozzle having an opening at one end; and a current contact tube extending longitudinally in said gas nozzle and having a shield portion forming the downstream end of said current contact tube, said shield portion not forming part of a welding current circuit, said shield portion being partially spaced within said gas nozzle opening, said shield portion extending beyond said gas nozzle opening for such a distance that said gas nozzle opening is shielded from metal spatter and from arc heat radiating toward said nozzle.

3. The invention defined in claim 2 wherein said current contact tube has a longitudinal bore which is of enlarged diameter for the portion of its length which extends through said shield portion of said current contact tube.

4. In an arc-welding gun for applying gas-shielded consumable-electrode arc-welding processes and which includes a gas nozzle having an opening at one end and a current contact member having a longitudinal bore, wherein the invention comprises: a shield element partially spaced within said gas nozzle opening, said shield element not forming part of a welding current circuit but having a longitudinal bore aligned with said current contact tube bore, said shield element extending beyond said gas nozzle opening for such a distance that said gas nozzle is shielded from metal spatter and from arc heat radiating toward said gas nozzle.

5. In an arc-welding gun for applying gas-shielded consumable-electrode arc-welding processes and which includes a gas nozzle having an opening at one end and a current contact tube having a longitudinal bore, wherein the invention comprises: a shield element partially spaced within said gas nozzle opening and extending beyond said current contact member, said shield element not forming part of a welding current circuit but having a longitudinal bore aligned with said current contact tube bore, said shield element extending beyond said gas nozzle opening for such a distance that said gas nozzle opening is shielded from metal spatter and from arc heat radiating toward said gas nozzle.

6. The invention defined in claim 5 wherein said shield element bore is larger in diameter than said current contact member bore.

7. The invention defined in claim 5 wherein said shield element includes shielding surfaces of heat-resistant electrically nonconductive material.

8. The invention defined in claim 5 wherein said shield element comprises a heat-resistant electrically nonconductive material.

9. The invention defined in claim 5 wherein said shield element is attached to said current contact tube.

10. The invention defined in claim 5 wherein said shield element is integral with said current contact tube.

11. The invention defined in claim 5 wherein said shield element is attached to said gas nozzle by a plurality of elements extending between said gas nozzle and said shield element.

12. The invention defined in claim 5 wherein said shield element is of cylindrical configuration.

13. The invention defined in claim 5 wherein said shield element is of spherical configuration.